US010765097B2

(12) United States Patent
Chew et al.

(10) Patent No.: US 10,765,097 B2
(45) Date of Patent: Sep. 8, 2020

(54) DUAL-BEARING REEL

(71) Applicants: Shimano Inc., Sakai, Osaka (JP); Shimano Components (Malaysia) SDN. BHD., Pontian, Johor (MY)

(72) Inventors: Chun Wee Chew, Johor (MY); Shoji Nakagawa, Sakai (JP); Shingo Aoki, Sakai (JP); Kotaro Shinzaki, Sakai (JP); Takashi Saito, Sakai (JP)

(73) Assignees: SHIMANO INC., Sakai, Osaka (JP); SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 111 days.

(21) Appl. No.: 16/224,097

(22) Filed: Dec. 18, 2018

(65) Prior Publication Data
US 2019/0208755 A1    Jul. 11, 2019

(30) Foreign Application Priority Data
Jan. 11, 2018   (JP) ................................ 2018-002598

(51) Int. Cl.
*A01K 89/01*       (2006.01)
*A01K 89/015*      (2006.01)

(52) U.S. Cl.
CPC ...... *A01K 89/0193* (2015.05); *A01K 89/0175* (2015.05); *A01K 89/0192* (2015.05)

(58) Field of Classification Search
CPC .............. A01K 89/016; A01K 89/0192; A01K 89/0193; A01K 89/0178
See application file for complete search history.

(56) References Cited

U.S. PATENT DOCUMENTS

| | | | | |
|---|---|---|---|---|
| 4,585,182 | A | * | 4/1986 | Atobe ................ A01K 89/0192 242/223 |
| 5,875,986 | A | * | 3/1999 | Miyazaki ........... A01K 89/0155 242/261 |
| 2003/0111569 | A1 | * | 6/2003 | Hitomi ........... A01K 89/011223 242/321 |
| 2011/0011966 | A1 | * | 1/2011 | Takechi ............. A01K 89/0192 242/255 |

(Continued)

FOREIGN PATENT DOCUMENTS

| | | | |
|---|---|---|---|
| JP | H08-10280 Y2 | 3/1996 | |
| JP | 2004-215531 A | 8/2004 | |
| KR | 20100069574 A * | 6/2010 | ......... A01K 89/0192 |

*Primary Examiner* — Emmanuel M Marcelo
(74) *Attorney, Agent, or Firm* — United IP Counselors, LLC (57) ABSTRACT

A dual-bearing reel includes a reel body, a spool, a handle, and a spool shaft. The reel body has a first side plate having a first opening that opens in an axial direction of the spool shaft and through which the spool can pass, a second side plate that faces the first side plate, and a second side cover that is mounted on the second side plate. The spool has a bobbin trunk and a second flange. The handle is rotatably provided on the first side plate side of the reel body. The second side plate has a second opening that opens in the axial direction and a fixing portion for mounting a second side cover member, the fixing portion being provided on a peripheral edge of the second opening and at a position overlapping the second flange as viewed in the axial direction.

13 Claims, 5 Drawing Sheets

(56) References Cited

U.S. PATENT DOCUMENTS

| | | | |
|---|---|---|---|
| 2016/0015015 A1* | 1/2016 | Niitsuma | A01K 89/0193 |
| | | | 242/288 |
| 2017/0196211 A1* | 7/2017 | Umezawa | A01K 89/0192 |
| 2017/0280697 A1* | 10/2017 | Nonogaki | H02K 7/14 |
| 2019/0141973 A1* | 5/2019 | Oogose | A01K 89/0193 |
| | | | 242/314 |

* cited by examiner

DUAL-BEARING REEL

CROSS-REFERENCE TO RELATED APPLICATIONS

This application claims priority to Japanese Patent Application No. 2018-002598, filed Jan. 11, 2018. The contents of that application are incorporated by reference in their entirety.

BACKGROUND

Technical Field

The present disclosure relates to a fishing reel, and in particular to a dual-bearing reel.

Background Information

A reel body of a dual-bearing reel has a frame including a pair of side plates facing each other. One of the pair of side plates is provided with an opening for removing the spool in order to wind fishing line around it. The opening is covered with a cover member that is fixed to the side plate. A screw hole for fixing the cover member is provided in the side plate (see Japanese Laid Open Patent Application No. 2004-215531 (Patent Document 1)). A mechanism that interlocks with the spool such as a mechanical counter is disposed on the side opposite the handle.

In the dual-bearing reel of Patent Document 1, an opening is provided in the side plate opposite the handle in order to facilitate arrangement of the mechanism interlocked with the spool on the side opposite the handle. In this case, since it is necessary to provide the screw hole of the side plate outside the opening so that the spool can be taken out from the opening, the size of the side plate in a radial direction increases. When an opening is not provided in the side plate on the side opposite the handle, as in the dual-bearing reel disclosed in Japanese Published Examined Utility Model Application No. H08-10280 (Patent Document 2), assembling the mechanism that interlocks with the spool becomes difficult.

BRIEF SUMMARY

It is an object of the present disclosure to reduce the size in a radial direction of a reel body on the side opposite a handle and to simplify installation in the reel body of a mechanism that interlocks with a spool and that is arranged on the side opposite the handle.

(1) A dual-body reel according to one aspect of the present disclosure has a reel body, a spool shaft, a spool, and a handle. The reel body has a first side plate, a second side plate that is disposed facing the first side plate with a space therebetween, and a cover member that is mounted on the second side plate to cover an outer side of the second side plate. The spool shaft is supported by the reel body. The spool is rotatably supported by the spool shaft between the first side plate and the second side plate, and has a bobbin trunk and a flange with a larger diameter than an outer diameter of the bobbin trunk on a second side plate side of the bobbin trunk. The handle is rotatably provided on a first side plate side of the reel body. The first side plate has a first opening that opens in an axial direction of the spool shaft and through which the spool can pass. The second side plate has a second opening that opens in the axial direction and a fixing portion for mounting the cover member on the second side plate, the fixing portion provided on a peripheral edge of the second opening and at a position overlapping the flange of the spool as viewed in the axial direction of the spool shaft.

In this dual-bearing reel, the fixing portion of the second side plate is provided at a position overlapping with the flange of the spool, that is, provided offset toward the inner diameter side, as viewed in the axial direction. Therefore, the size in the radial direction of the second side plate disposed on the side opposite the handle can be reduced. Also, since the fixing portion is provided on the peripheral edge of the second opening of the second side plate, the diameter of the second opening can be increased. Thereby, in the case where a mechanism that interlocks with the spool is installed on the second side plate side of the reel body, arrangement and assembly of the mechanism interlocking with the spool are simplified.

(2) The fixing portion preferably protrudes inward in a radial direction from the peripheral edge of the second opening.

(3) The fixing portion preferably extends outward in the axial direction from a side surface of the second side plate and has a threaded portion in an inner periphery thereof.

(4) The cover member is preferably fixed to the second side plate by a screw member that is inserted in the fixing portion from an outer side in the axial direction.

(5) One of the cover member and the second side plate preferably has a protrusion that extends toward the other of the cover member and the second side plate, and the other of the cover member and the second side plate has an engaging portion that is provided at a position overlapping with the flange of the spool as viewed in the axial direction and engages with the protrusion. In this case, positioning of the cover member when fixing the cover member to the second side plate can be facilitated.

(6) The dual-bearing reel is preferably further provided with a bearing that is disposed in the cover member and that supports one end of the spool shaft.

(7) The dual-bearing reel is preferably further provided with an interlocking mechanism that is provided on the second side plate side of the reel body and that interlocks with the spool. In this case, since the fixing portion of the second side plate is provided at the peripheral edge of the second opening of the second side plate, the diameter of the second opening can be increased, and arrangement and assembly of the mechanisms interlocking with the spool are simplified.

According to the dual-bearing reel of this disclosure, it is possible to reduce the size in the radial direction of the reel body on the side opposite the handle, and to simplify installation in the reel body of a mechanism that interlocks with the spool and that is disposed on the side opposite the handle.

DETAILED DESCRIPTION OF EMBODIMENTS

In the following description, "front(ward)" denotes the direction in which a fishing line is cast when fishing, while "rear(ward)" refers to the opposite direction. In addition, "left" and "right" refer to left and right when a dual bearing reel 100 (see FIG. 1) is viewed from the rear. Further, a right side of each member constituting the dual-bearing reel 100 is described as a first side, and a left side as a second side. "Axial direction" denotes the direction of extension of a spool shaft 10 (see FIG. 4).

Figure 1:
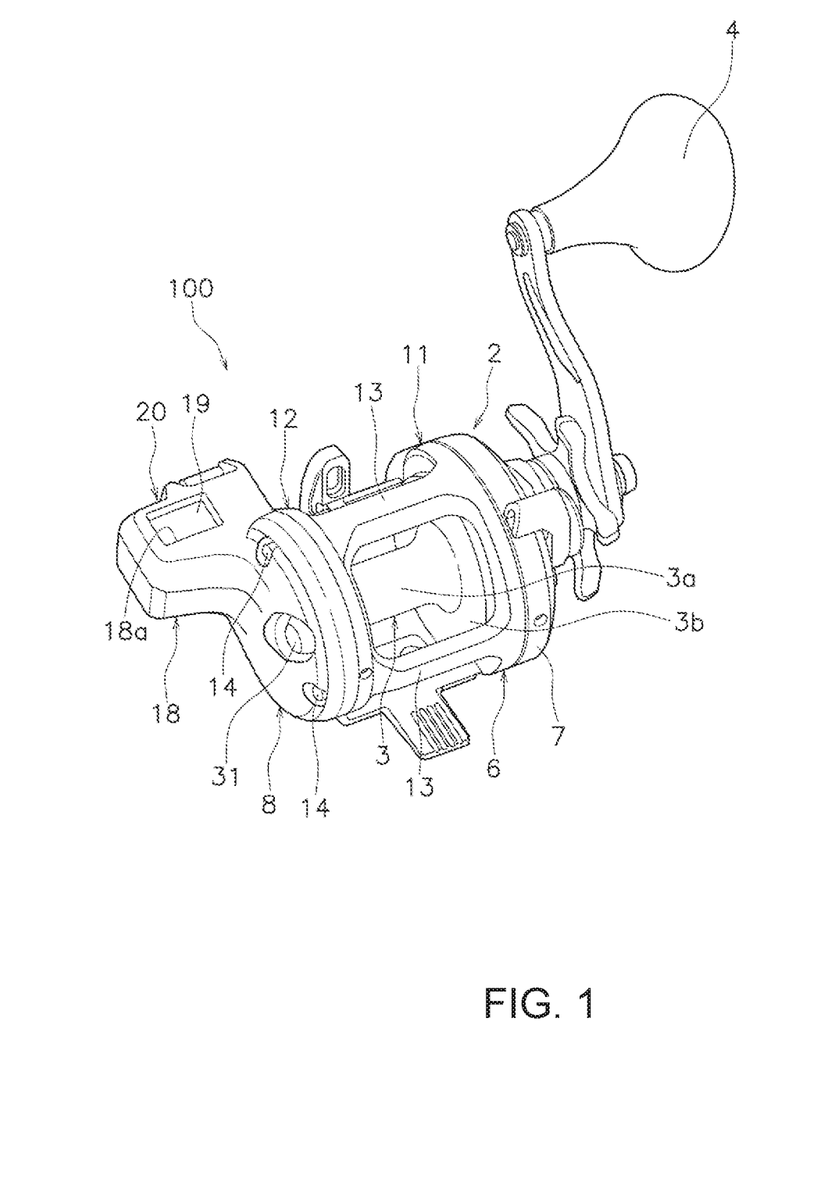
FIG. 1 is a perspective view of a dual-bearing reel of one embodiment of the present disclosure.

The dual bearing reel 100 of one embodiment of the present disclosure is capable of reeling out fishing line frontward. As shown in FIG. 1, the dual bearing reel 100 is provided with a reel body 2, a spool 3, a handle 4, a counter 20, and a sounding mechanism 30 (see FIG. 5).

Figure 2:
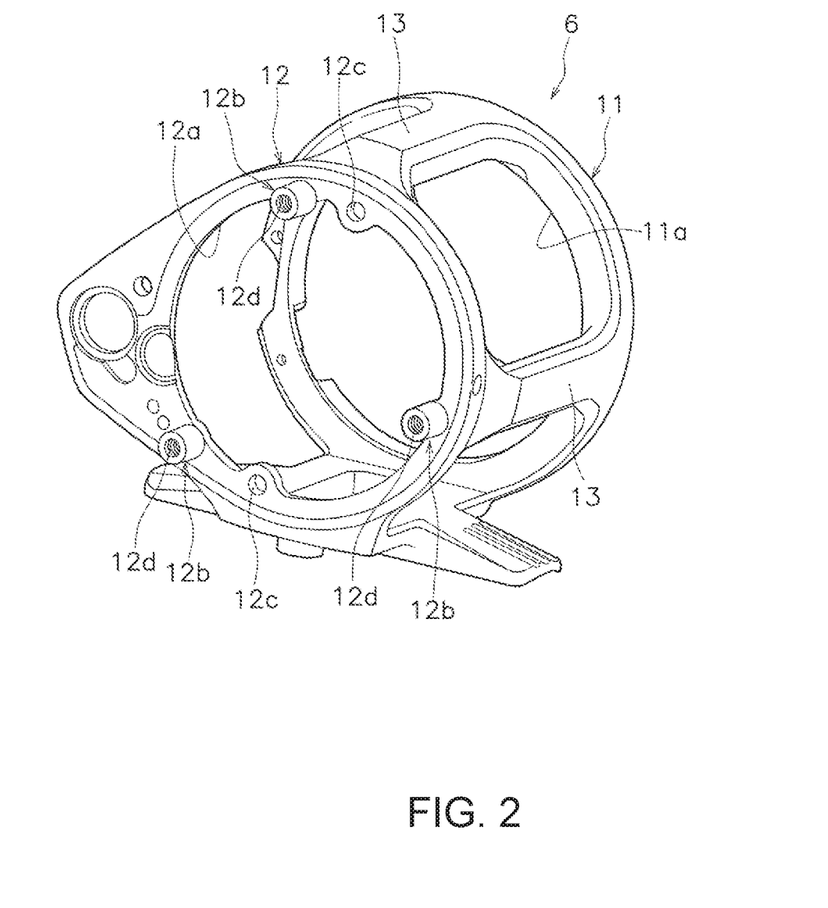
FIG. 2 is a perspective view of the frame.
Figure 3:
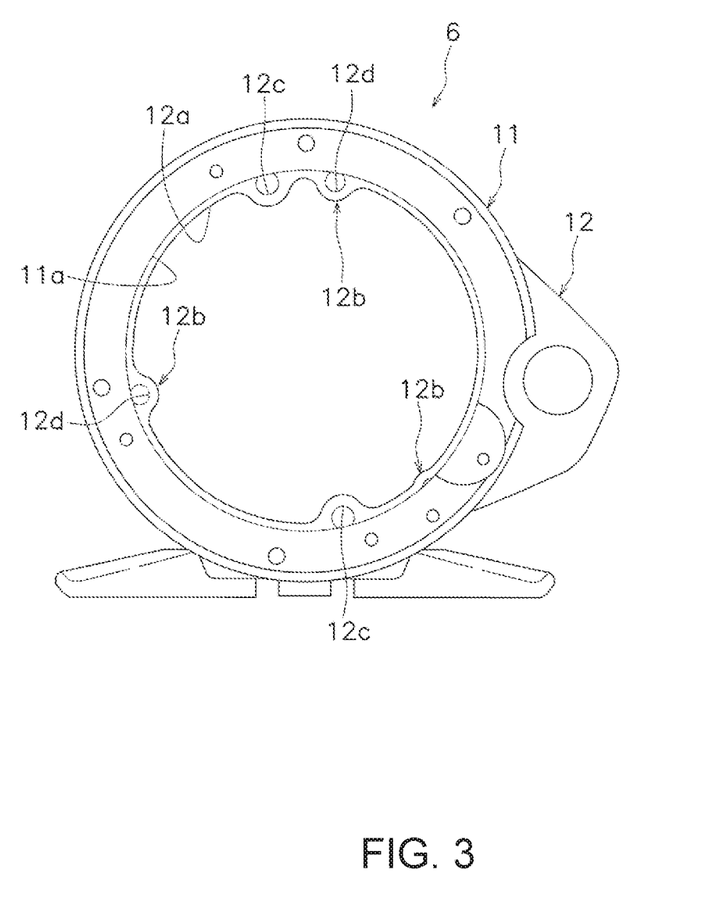
FIG. 3 is a right-side view of the frame.
Figure 4:
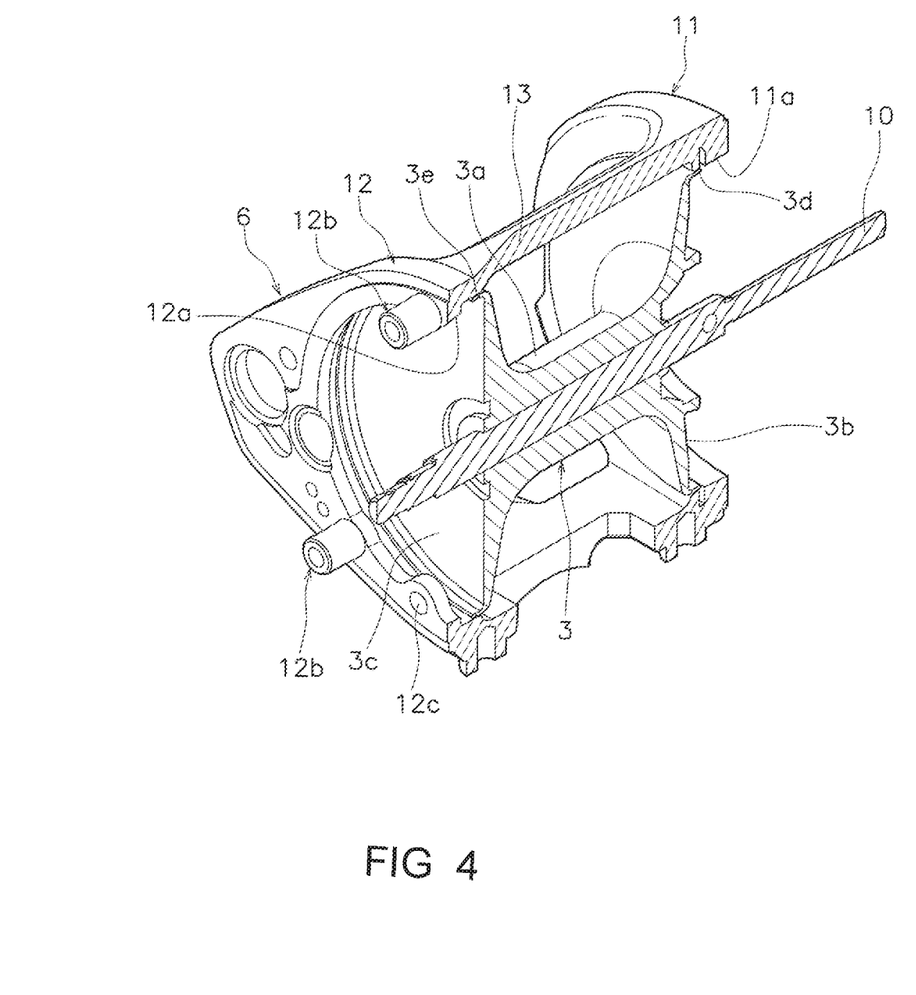
FIG. 4 is a cross-sectional perspective view of the frame and spool.

The reel body 2 has a frame 6, a first side cover 7, and a second side cover 8. As shown in FIGS. 2 to 4, the frame 6 has a first sideplate 11, a second sideplate 12, and a plurality of couplers 13. FIG. 3 is a right side view of the frame 6.

The first side plate 11 is annular and is arranged on a right side of the frame 6. The first sideplate 11 has a first opening 11a that opens in the axial direction and through which the spool 3 can pass.

The second side plate 12 is arranged on a left side of the frame 6. The second side plate 12 is disposed facing the first side plate 11 with a space therebetween in the axial direction. The second side plate 12 is substantially annular, and has a second opening 12a, a plurality of fixing portions 12b, and a plurality of engaging portions 12c. It is sufficient that at least one each of the fixing portion 12b and the engaging portion 12c be provided. The second opening 12a opens in the axial direction. As shown in FIGS. 3 and 4, a diameter of the second opening 12a (the maximum diameter of an inner peripheral surface excluding the fixing portion 12b) is smaller than a diameter of the first opening 11a and a diameter of the spool 3.

The fixing portion 12b is provided on a peripheral edge of the second opening 12a. In the present embodiment, the fixing portion 12b is cylindrical, protrudes in the axial direction from a side surface of the second side plate 12 and protrudes inward in the radial direction from the peripheral edge of the second opening 12a. Three fixing portions 12b are provided spaced apart in a circumferential direction of the second side plate 12. In order to attach the second side cover 8 to the second side plate 12, each of the fixing portions 12b has a threaded portion 12d in an inner periphery thereof. In the illustrated embodiment, the threaded portion 12d is a threaded hole. Individually and collectively, the fixing portions 12b are examples of mounting means for mounting the second side cover 8 to the second side plate 12, and the threaded portion 12d is an example of means for engaging a fastener.

The engaging portion 12c is a circular hole penetrating a side of the second side plate 12 in the axial direction. Two engaging portions 12c are provided spaced apart in the circumferential direction at different positions than the fixing portions 12b. An outer periphery of each engaging portion 12c protrudes inward in the radial direction from the peripheral edge of the second opening 12a. Here, since the fixing portion 12b and the engaging portion 12c are provided protruding radially inward from the peripheral edge of the second opening 12a, the size of the second side plate 12 in the radial direction can be reduced.

The plurality of the couplers 13 extend in the axial direction and couple the first side plate 11 and the second side plate 12.

As shown in FIG. 1, the first side cover 7 covers the right side of the first side plate 11 of the frame 6. The second side cover 8 covers the left side of the second side plate 12 of the frame 6. The second side cover 8 is an example of a cover member. The second side cover 8 is fixed to the second side plate 12 by a screw member 14 that is mounted to the fixing portion 12b of the second side plate 12 from an outer side in the axial direction.

Figure 5:
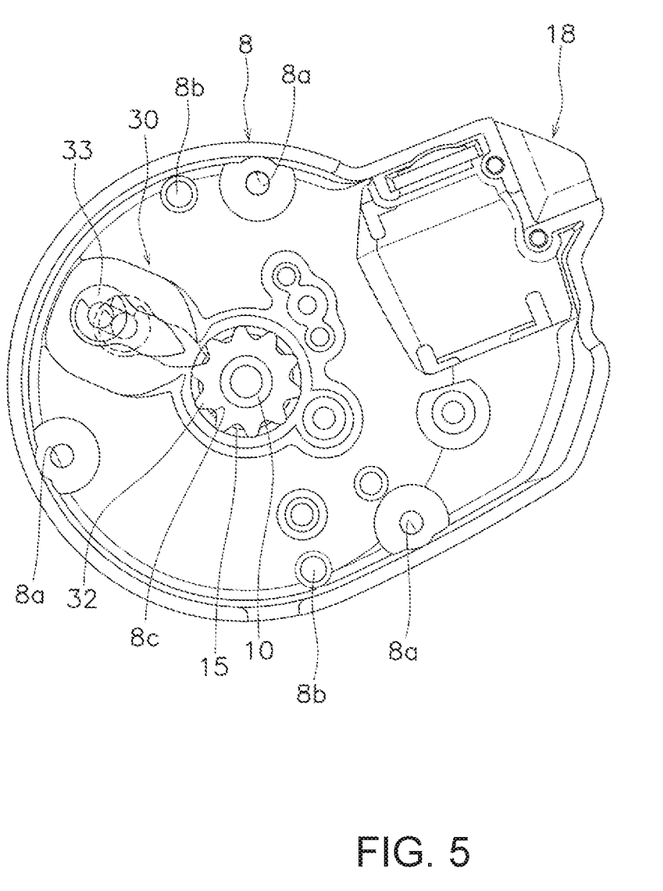
FIG. 5 is a right-side view of the second side cover.

As shown in FIG. 5, the second side cover 8 has a plurality of insertion holes 8a and a plurality of protrusions 8b. Each insertion hole 8a is a hole penetrating in the axial direction and is formed at a position overlapping the fixing portion 12b in the axial direction. The screw member 14 inserted from the insertion hole 8a toward the second side plate 12 is screwed into the threaded portion 12d of the fixing portion 12b of the second side plate 12, whereby the second side cover 8 is fixed to the second sideplate 12. The insertion holes 8a and the protrusions 8b are a second example of mounting means for mounting the second side cover 8 to the second side plate 12.

As shown in FIG. 5, the protrusion 8b is a cylindrical protrusion and extends toward the second side plate 12. The protrusion 8b engages with the engaging portion 12c of the second side plate 12. Thereby, the second side cover 8 can be easily positioned with respect to the second side plate 12.

As shown in FIGS. 1 and 4, the spool 3 is rotatably supported by the reel body 2 between the first side plate 11 and the second side plate 12. More specifically, the spool 3 is fixed to the spool shaft 10 that penetrates the center of the spool 3 in the axial direction and rotates integrally with the spool shaft 10. A first (right) side of the spool shaft 10 is rotatably supported by a bearing (not shown) disposed in the reel body 2. Further, as shown in FIG. 5, a second (left) side of the spool shaft 10 is rotatably supported by a bearing 15 disposed in the second side cover 8. The bearing 15 is housed in a bearing housing 8c provided in the second side cover 8.

The spool 3 has a bobbin trunk 3a, a first flange 3b, and a second flange 3c (an example of a flange). An outer periphery of the bobbin trunk 3a is cylindrical, with a fishing line wound around the outer periphery. An outer diameter of the bobbin trunk 3a is smaller than the diameter of the second opening 12a of the second side plate 12. That is, the second opening 12a of the second side plate 12 has a larger diameter than an outer diameter of the bobbin trunk 3a.

The first flange 3b is formed on the first side plate 11 side of the bobbin trunk 3a with a diameter larger than the outer diameter of the bobbin trunk 3a. The first flange 3b has at a distal end thereof a first outer peripheral portion 3d extending in the axial direction toward the first side plate 11. The first outer peripheral portion 3d is disposed to face an inner peripheral portion of the first side plate 11.

The second flange 3c is formed on the second side plate 12 side of the bobbin trunk portion 3a with a diameter larger than the outer diameter of the bobbin trunk 3a. The second flange 3c has at a distal end thereof a second outer peripheral portion 3e extending in the axial direction toward the second side plate 12. The second outer peripheral portion 3e is disposed to face an inner peripheral portion of the second side plate 12. In the present embodiment, the outer diameters of the first flange 3b and the second flange 3c are the same. The outer peripheral portion of the second flange 3c overlaps the fixing portion 12b and the engaging portion 12c of the second side plate 12 as viewed in the axial direction. That is, the fixing portion 12b and the engaging portion 12c of the second side plate 12 are provided at positions overlapping with the second flange 3c when viewed in the axial direction.

As shown in FIG. 1, the handle 4 is rotatably provided on the first side (right side) of the reel body 2. Rotation of the handle 4 is transmitted to the spool 3 via a rotation transmission mechanism (not shown). Since the rotation transmission mechanism has the same structure as a conventional one, a description thereof will be omitted.

The counter 20 is a mechanical-type counter, with the numerical value changing in conjunction with the rotation of the spool 3. The counter 20 is an example of an interlocking mechanism. The counter 20 is located along an upper portion of the side surface of the second side plate 12 side of the reel body 2. The counter 20 is accommodated in a case member 18 provided integrally with the second side cover 8 of the reel body 2. The case member 18 has a bottomed cylindrical shape and extends outward in the axial direction. The numerical value of the counter 20 is visible from an opening 18a provided in the case member 18. The opening 18a is covered with a transparent lens 19.

The rotation of the spool 3 is transmitted to the counter 20 via a counter drive mechanism (not shown) accommodated in the second side cover 8. Details of the counter drive mechanism are the same as those of a conventional configuration, so a description thereof will be omitted.

As shown in FIG. 5, the sounding mechanism 30 generates sound in conjunction with the rotation of the spool 3 and imparts resistance to the rotation of the spool 3. The sounding mechanism 30 is an example of an interlocking mechanism. The sounding mechanism is switched between a sound producible state and a sound non-producible state according to the position of an operating part 31 (see FIG. 1) movably provided on the second side cover 8. In the sound producible state, a sounding member 33 that is biased toward a rotation center of a concavo-convex member 32, which is connected to the spool shaft 10 in an integrally rotatable manner, by a biasing member (not shown) makes contact with the concavo-convex member 32. When the concavo-convex member 32 rotates in the sound producible state, the concavo-convex member 32 and the sounding member 33 repeatedly collide, whereby the sounding member 33 produces sound. Since the details of the sound producing mechanism 30 are the same as those of a conventional configuration, a detailed description thereof will be omitted.

In the dual-bearing reel 100 having the above-described configuration, the fixing portion 12b of the second side plate 12 is provided at a position overlapping with the second flange 3c of the spool 3, that is, provided offset toward the inner diameter side, as viewed in the axial direction. Therefore, for example, as compared with the case in which the fixing portion 12b of the second side plate 12 is provided outside the second flange 3c of the spool 3 in the axial direction, the size in the radial direction of the second side plate 12 can be reduced. In addition, with the reduction in size in the radial direction of the second side plate 12, the size in the radial direction of the second side cover 8 covering the second side plate 12 can also be reduced. This makes it possible to obtain a good hold on the reel body 2 when grasping the second side of the reel body 2. Furthermore, since the fixing portion 12b of the second side plate 12 is provided on the peripheral edge of the second opening 12a, the diameter of the second opening 12a of the second side plate 12 can be increased. Thereby, in the case where mechanisms that interlock with the spool 3 such as the counter 20 and the sounding mechanism 30 are installed on the second side plate 12 side of the reel body 2, which is the side opposite the handle 4, arrangement and assembly of the mechanisms interlocking with the spool 3 are simplified.

OTHER EMBODIMENTS

Although one embodiment of the present disclosure has been described in detail above, it is to be understood that the present disclosure is not limited to this embodiment, and various modifications may be made within a scope not departing from the gist of the disclosure. In particular, the plurality of the embodiments and modifications disclosed in the present specification can be arbitrarily combined with each other according to necessity.

(a) In the above embodiment, the protrusions 8b are provided on the second side cover 8 and the engaging portions 12c are provided on the second side plate 12. However, it is not always necessary to provide the protrusions 8b and the engaging portions 12c. Further, a protruding portion that protrudes toward the second side plate 12 may be provided on the second side cover 8, and an engaging portion to be engaged with the protruding portion may be provided on the second side plate 12. In this case, by providing the engaging portion at a position overlapping with the second flange 3c of the spool 3 as viewed in the axial direction, it is possible to obtain the same effect as in the above embodiment.

(b) In the above embodiment, the counter 20 and the sounding mechanism 30 are provided as interlocking mechanisms interlocking with the spool 3, but the interlocking mechanisms are not limited to the above embodiment. For example, when a level wind mechanism for uniformly winding the fishing line on the spool 3 is interlocked with the rotation of the spool 3, a transmission mechanism for transmitting the rotation of the spool 3 to the level wide mechanism may be provided on the second side plate 12 side.

(c) In the above embodiment, each fixing portion 12b of the second side plate 12 extends outward in the axial direction from a side surface of the second side plate 12, but the shape of the fixing portion 12b is not limited to that of the above embodiment. The fixing portion 12b need only be provided at the peripheral edge of the second opening 12a and at a position overlapping with the second flange 3c of the spool 3 when viewed in the axial direction. For example, each fixing portion 12b may be a threaded hole provided protruding outward at a position to the inside in the radial direction from the inner periphery of the second side plate 12.

What is claimed is:
1. A dual-bearing reel comprising:
a reel body having a first side plate, a second side plate that is disposed facing the first side plate with a space therebetween, and a cover member that is mounted on the second side plate to cover an outer side of the second side plate;
a spool shaft that is supported by the reel body;
a spool that is rotatably supported by the spool shaft between the first side plate and the second side plate, and that has a bobbin trunk and a flange with a larger diameter than an outer diameter of the bobbin trunk on a second side plate side of the bobbin trunk; and
a handle rotatably provided on a first side plate side of the reel body,
wherein the first side plate has a first opening that opens in an axial direction of the spool shaft and through which the spool can pass, and
the second side plate has a second opening that opens in the axial direction and a fixing portion configured to mount the cover member on the second side plate, the fixing portion provided on a peripheral edge of the second opening and at a position overlapping the flange of the spool as viewed in the axial direction.

2. The dual-bearing reel according to claim 1, wherein the fixing portion protrudes inward in a radial direction from the peripheral edge of the second opening.

3. The dual-bearing reel according to claim 1, wherein the fixing portion extends outward in the axial direction from a side surface of the second side plate and has a threaded portion in an inner periphery thereof.

4. The dual-bearing reel according to claim 1, wherein the cover member is fixed to the second side plate by a screw member that is inserted in the fixing portion from an outer side in the axial direction.

5. The dual-bearing reel according to claim 1, wherein one of the cover member and the second side plate has a protrusion that extends toward the other of the cover member and the second side plate, and the other of the cover member and the second side plate has an engaging portion that is provided at a position overlapping with the flange of the spool as viewed in the axial direction and engages with the protrusion.

6. The dual-bearing reel according to claim 1, further comprising
a bearing that is disposed in the cover member and that supports one end of the spool shaft.

7. The dual-bearing reel according to claim 1, further comprising
an interlocking mechanism that is provided on the second side plate side of the reel body and that interlocks with the spool.

8. The dual-bearing reel according to claim 7, wherein the interlocking mechanism includes a counter or a sounding mechanism.

9. A reel body comprising:
a first side plate having a first opening that opens in an axial direction;
a second side plate that is disposed facing the first side plate with a space therebetween; and
a cover member that is mounted on the second side plate to cover an outer side of the second side plate, wherein
the second side plate has a second opening that opens in the axial direction and a fixing portion configured to mount the cover member on the second side plate, the fixing portion extending radially inward from an inner peripheral edge of the second opening, and
the fixing portion extends outward in the axial direction from a side surface of the second side plate and has a threaded portion in an inner periphery thereof.

10. The reel body according to claim 9, wherein
the cover member is fixed to the second side plate by a screw member that is inserted in the fixing portion from an outer side in the axial direction.

11. A reel body comprising:
a first side plate having a first opening that opens in an axial direction;
a second side plate that is disposed facing the first side plate with a space therebetween; and
a cover member that is mounted on the second side plate to cover an outer side of the second side plate, wherein
the second side plate has a second opening that opens in the axial direction and a fixing portion configured to mount the cover member on the second side plate, the fixing portion extending radially inward from an inner peripheral edge of the second opening,
one of the cover member and the second side plate has a protrusion that extends toward the other of the cover member and the second side plate, and
the other of the cover member and the second side plate has an engaging portion that is provided at a position overlapping with a flange of a spool as viewed in the axial direction and engages with the protrusion.

12. The reel body according to claim 11, further comprising:
a mechanism that interlocks with the fixing portion to mount on the second side plate.

13. The reel body according to claim 12, wherein the mechanism is a counter or a sounding mechanism.

* * * * *